United States Patent

Kurami

[11] Patent Number: 5,155,426
[45] Date of Patent: Oct. 13, 1992

[54] VEHICLE STEERING CONTROL APPARATUS

[75] Inventor: Kunihiko Kurami, Kawasaki, Japan

[73] Assignee: Nissan Motor Co., Ltd., Japan

[21] Appl. No.: 790,402

[22] Filed: Nov. 12, 1991

[30] Foreign Application Priority Data

Nov. 30, 1990 [JP] Japan .................. 2-336460

[51] Int. Cl.$^5$ ..................... G05D 1/02; B62D 1/02
[52] U.S. Cl. .................. 318/587; 364/424.02; 180/168
[58] Field of Search ............ 318/587, 590; 180/167, 180/168, 169; 250/202; 364/424.01, 424.02; 340/465; 901/1, 46, 47

[56] References Cited

U.S. PATENT DOCUMENTS

| | | | |
|---|---|---|---|
| 3,708,668 | 1/1973 | Tilley | 250/202 |
| 4,003,445 | 1/1977 | De Bruine | 180/168 |
| 4,278,142 | 7/1981 | Kono | 180/168 |
| 4,307,791 | 12/1981 | De Bruine | 180/168 |
| 4,530,056 | 7/1985 | MacKinnon et al. | 364/424.02 |
| 4,996,468 | 2/1991 | Field et al. | 318/587 |
| 5,032,994 | 7/1991 | Wellman | 318/587 X |

Primary Examiner—Bentsu Ro
Attorney, Agent, or Firm—Lowe, Price, LeBlanc & Becker

[57] ABSTRACT

To smoothly switching the steering direction of the vehicle automatically driven along a road, leftward and rightward steering angles ($\theta_L$, $\theta_R$) are obtained on the basis of leftward and rightward white lines and by means of leftward and rightward cameras (7, 8) and image processors (9, 10) and a calculator (12), respectively. The obtained leftward and rightward steering angles are compared by a switching section (3). The steering angle output ($\theta_{out}$) is switched to the leftward or rightward steering angle ($\theta_L$, $\theta_R$) only when both steering angles first roughly match each other, after the steering angle direction signal has been inputted to the switching section from another travel control unit.

8 Claims, 3 Drawing Sheets

VEHICLE STEERING CONTROL APPARATUS

BACKGROUND OF THE INVENTION

1. Field of the Invention

The present invention relates to a vehicle steering control apparatus which can automatically drive a vehicle along a road on the basis of both road end position information (e.g. leftward and rightward white lines) and in response to steering direction instructions.

2. Description of the Prior Art

An example of prior-art vehicle steering control apparatus will be explained with reference to FIG. 1. In FIG. 1, two cameras 7 and 8 mounted on a front portion of a vehicle 4 is switched from the leftward camera 7 to the rightward camera 8 or vice versa in accordance with a predetermined travel plan, in order to detect a road end position data such as a distance $X_L$ between a leftward white line 5 and a vehicle longitudinal axis y at a frontward observation point OP (a distance L ahead of the vehicle 4) and a rightward road end position data such as a distance $X_R$ between a rightward white line 6 and the vehicle longitudinal axis y, or a leftward inclination angle $\phi_L$ between the vehicle axis y and the white line 5 or 6 and a rightward inclination angle $\phi_R$ between the vehicle axis y and the white line 5 or 6. The steering operation of the vehicle 4 is self-controlled on the basis of these detected steering data. In more detail, in the case where the vehicle travel plan is previously determined in such a way that the vehicle is first turned to the left and then to the right, the leftward camera 7 mounted on the vehicle front portion detects the leftward data $X_L$ or $\phi_L$ at the left turn and the leftward steering angle $\phi_L$ is determined on the basis of the detected leftward data. Further, the rightward camera 8 detects the rightward data $X_R$ or $\phi_R$ at the succeeding right turn and the rightward steering angle $\theta_R$ is determined on the basis of the detected rightward data. Therefore, the steering angle $\theta_{out}$ to be outputted is simply determined as the leftward steering angle $\theta_L$ at the left turn and as the rightward steering angle $\theta_R$ at the right turn.

Here, the leftward camera 7 is switched to the rightward camera 8, for instance, at the timing when the leftward steering inclination angle $\phi_L$ detected as the leftward road end position (white line) data is reduced below a predetermined value (zero or almost zero) after a steering direction instruction (for switching the steering angle output $\theta_{out}$ to the rightward steering angle $\theta_R$) has been inputted to the control system. This is because when the vehicle 4 has been steered almost in parallel to the leftward white line 5 after the left turn, it is possible to consider that the left turn has been completed.

In the prior-art steering control apparatus, however, when the vehicle is turned consecutively from the left to the right or vice versa, since the camera (i.e. steering direction) switching timing is determined on the basis of only the inclination angle, there exists a problem in that the steering angle is not switched smoothly at the same predetermined value at the left and right turns, so that the steering operation is not effected smoothly and continuously, thus causing steering vibration.

In particular, where the vehicle runs along a crankshaped road with a short straight line section; that is, where the vehicle is quickly turned to the left and then right or vice versa, the camera switching timing is too late for the succeeding steering operation, even if the steering angle is switched from the left steering angle to the right steering angle or vice versa, after the inclination angle detected as the white line data has been reduced down to almost zero or the vehicle has been driven in parallel to the leftward white line, so that the vehicle is not sufficiently turned to the left. To overcome this problem, when the steering angle is switched from the left steering angle to the right steering angle before the vehicle is sufficiently steered in parallel to the leftward white line (e.g. when the inclination angle is reduced below 3 degrees), although the vehicle can be sufficiently turned to the right, since the steering angle obtained on the basis of the leftward white line immediately before the steering is switched is not continuous to that obtained on the basis of the rightward white line after the steering has been switched, thus also causing steering vibration.

SUMMARY OF THE INVENTION

With these problems in mind, therefore, it is the object of the present invention to provide a vehicle steering control apparatus which can smoothly switch the steering directions at appropriate timings.

To achieve the above-mentioned object, the present invention provides a vehicle steering control apparatus for automatically driving a vehicle along a road on the basis of both road end position information and in response to a steering direction switching signal, comprising: (a) leftward detecting means (7A) for cyclically detecting a leftward road end position data ($X_L$); (b) leftward steering angle calculating means (1) for calculating a leftward steering angle ($\theta_L$) on the basis of the detected leftward road end position data; (c) rightward detecting means (7B) for cyclically detecting a rightward road end position data ($X_R$); (d) rightward steering angle calculating means (2) for calculating a rightward steering angle ($\theta_R$) on the basis of the detected rightward road end position data; (e) switching means (3) for switching a vehicle steering angle output ($\theta_{out}$) from the calculated leftward steering angle ($\theta_L$) to the calculated rightward steering angle ($\theta_R$) or vice versa in accordance with the steering direction switching signal ($S_{sw}$) at a timing when the calculated leftward and rightward angles match each other; and (f) steering driving means (11) for driving vehicle steering in accordance with the switched steering angle output.

The leftward detecting means (7A) comprises: (a) a leftward camera (7) mounted on a leftward front portion of the vehicle, for cyclically taking an image of the leftward road end position information (5); (b) a leftward image processor (9) for detecting a leftward distance ($X_L$) between the leftward road end position information and a vehicle longitudinal axis (y) at a frontward observation point (OP), and wherein said rightward detecting means (7B) comprises: (c) a rightward camera (8) mounted on a rightward front portion of the vehicle, for cyclically taking an image of the rightward road end position information (6); and (d) a rightward image processor (10) for detecting a rightward distance ($X_R$) between the rightward road end position information and the vehicle longitudinal axis (y) at the frontward observation point.

The switching means comprises: (a) a JK flip-flop (13) for outputting a first level setting signal ($S_{set}$) in response to a leftward steering direction switching signal ($S_{sw}$) and a second level setting signal ($S_{set}$) in response to a rightward steering direction switching signal ($S_{sw}$); (b) a comparator (14) for comparing the leftward steering angle ($\theta_L$) and the rightward steering angle ($\theta_R$) and outputting a compare signal ($S_{com}$) when differences between the two steering angles ($|\theta_L - \theta_R|$) becomes less than a predetermined small value ($\epsilon$); (c) a D flip-flop (15) for outputting a leftward steering signal ($S_L$) in accordance with the first level setting signal and in synchronism with the compare signal and a rightward steering signal ($S_R$) in accordance with the second level setting signal and in synchronism with the compare signal; (d) a leftward switch (16) for outputting the leftward steering angle ($\theta_L$) as a steering angle output ($\theta_{out}$) in response to the leftward steering signal ($S_L$); and (e) a rightward switch (17) for outputting the rightward steering angle ($\theta_R$) as a steering angle output ($\theta_{out}$) in response to the rightward steering signal ($S_R$).

Further, to achieve the above-mentioned object, the present invention provides a method of automatically driving a vehicle along a road on the basis of both road end position information and in response to a steering direction switching signal, comprising the steps of: (a) cyclically detecting a leftward distance ($X_L$) between the leftward road end position information and a vehicle longitudinal axis (y) at a frontward observation point and a rightward distance ($X_R$) between the rightward road end position information and the vehicle longitudinal axis at the frontward observation point; (b) calculating a leftward steering angle ($\theta_L$) on the basis of the detected leftward distance and a rightward steering angle ($\theta_L$) on the basis of the detected rightward distance; (c) checking whether the steering direction switching signal is a leftward steering switching signal or a rightward steering switching signal; (d) if the leftward steering switching signal is checked, checking whether the leftward steering angle ($\theta_L$) is approximately equal to the rightward steering angle ($\theta_L$); (e) if approximately equal thereto, switching the steering angle output ($\theta_{out}$) to the leftward steering angle ($\theta_L$) in accordance with the checked leftward steering switching signal; (f) if the rightward steering switching signal is checked, checking whether the rightward steering angle ($\theta_L$) is approximately equal to the leftward steering angle ($\theta_R$); and (g) if approximately equal thereto, switching the steering angle output ($\theta_{out}$) to the rightward steering angle ($\theta_R$) in accordance with the checked rightward steering switching signal. Even if the leftward steering switching signal is checked, the rightward steering angle ($\theta_R$) is kept outputted as the steering angle output ($\theta_{out}$) when the rightward steering angle ($\theta_R$) is more than the leftward steering angle ($\theta_L$); and even if the rightward steering switching signal is checked, the leftward steering angle ($\theta_L$) is kept outputted as the steering angle output ($\theta_{out}$) when the leftward steering angle ($\theta_L$) is more than the rightward steering angle ($\theta_R$). When the leftward steering switching signal is checked, and further the steering angle output ($\theta_{out}$) has already been switched to the leftward steering angle ($\theta_L$), the leftward steering angle is kept outputted as the steering angle output; and when the rightward steering switching signal is checked, and further the steering angle output ($\theta_{out}$) has already been switched to the rightward steering angle ($\theta_R$), the rightward steering angle is kept outputted as the steering angle output.

In the control apparatus according to the present invention, since the steering direction is switched when the leftward steering angle, for instance, matches the preceding (finally detected) rightward steering angle before the steering angle is reduced down to zero (in parallel to the white lines), it is possible to more quickly switch the steering angle, after the steering direction switching instruction has been received.

DETAILED DESCRIPTION OF THE PREFERRED EMBODIMENTS

An embodiment of the steering control apparatus according to the present invention will be described hereinbelow with reference to the attached drawings.

Figure 1:
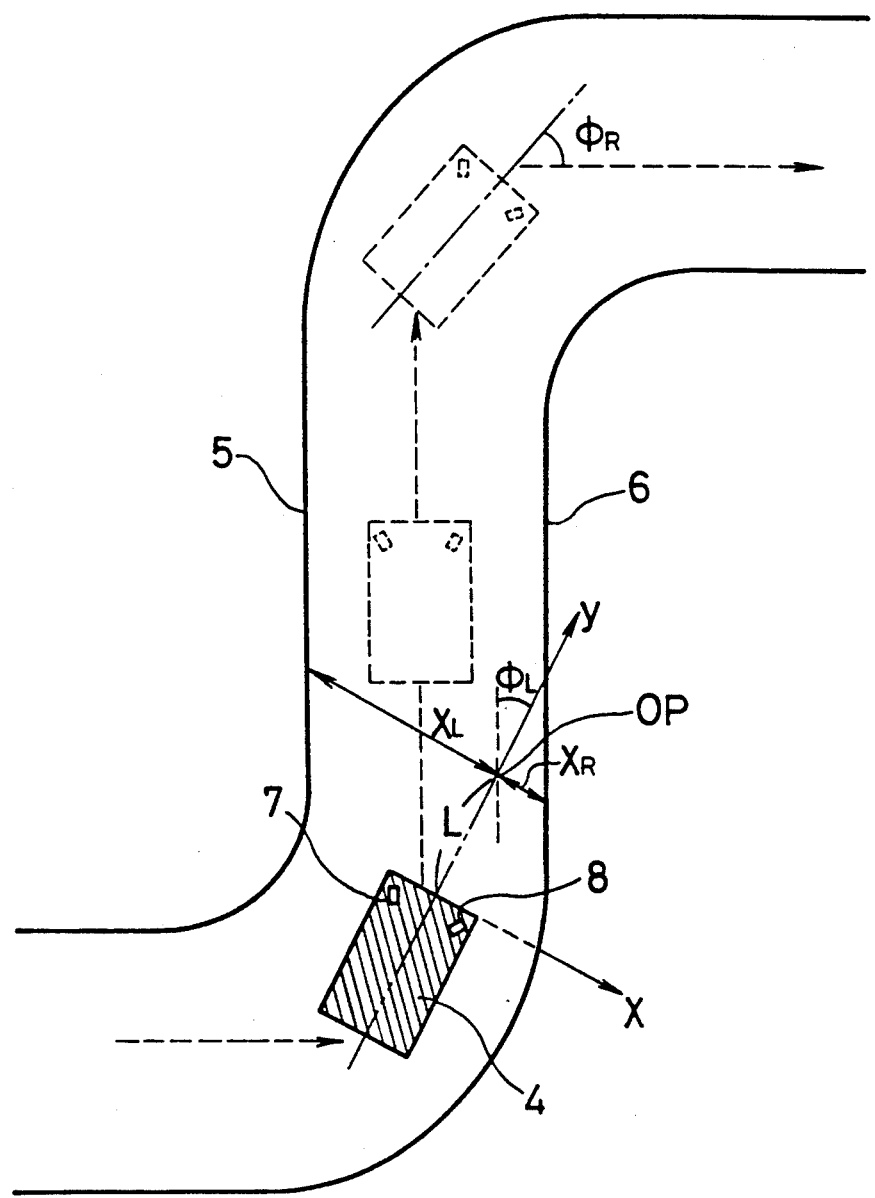
FIG. 1 is an illustration for assistance in explaining the method of self-controlling the vehicle steering.
Figure 2:
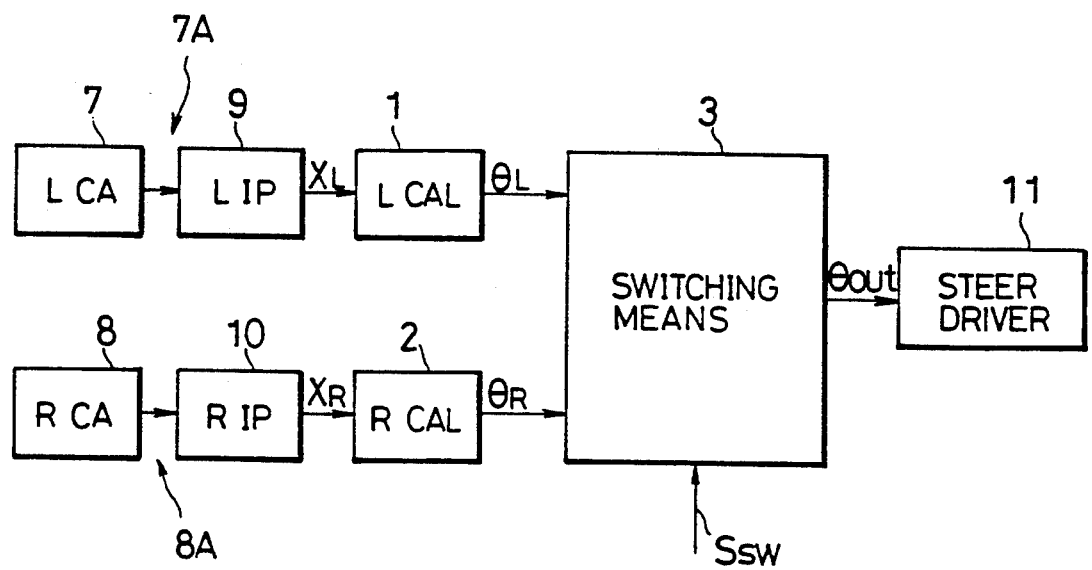
FIG. 2 is a block diagram showing an embodiment of the steering control apparatus according to the present invention.

In FIG. 2, the apparatus comprises a leftward camera 7 mounted on the leftward front portion of a vehicle 4; a leftward image processor 9; a leftward steering angle calculator 1; a rightward camera 8 mounted on the rightward front portion of the vehicle 4; a rightward image processor 10; a rightward steering angle calculator 2; steering angle switching means 3 responsive to steering direction instruction signals $S_{SW}$; and a steering driver 11.

Further, the assumption is made that a left side white line 5 is painted or drawn on the left side of a road along which the vehicle 4 is travelling, and a right side white line 6 is painted or drawn on the right side thereof, and the vehicle 4 is travelling along the road by turning to the left or the right. Here, without being limited thereto, it is of course possible to use three-dimensional objects (e.g. conical rubbers) arranged along both the sides of the road as the road end position information, instead of the white lines.

The leftward camera 7 cyclically takes images of the left side white line 5, and the leftward image processor 9 processes the image signals in accordance with binary image signal processing method to obtain digital distance data $X_L$. That is, a leftward detecting means 7A composed of the leftward camera 7 and the leftward image processor 9 cyclically detects the leftward distance $X_L$ between the left side white line 5 and the vehicle longitudinal axis y at an observation point OP a distance L ahead of the vehicle 4, as the leftward white line data. In the same way, a rightward detecting means 8A composed of the rightward camera 8 and the rightward image processor 10 cyclically detects the rightward distance $X_R$ between the right side white line 6 and the vehicle longitudinal axis y at the observation point OP, as the rightward white line data.

The leftward steering angle calculator 1 calculates a leftward steering angle $\theta_L$ on the basis of the detected leftward distance $X_L$ and the rightward steering angle calculator 2 calculates a rightward steering angle $\theta_R$ on the basis of the detected rightward distance $X_R$ in accordance with an appropriate calculating method. One of these calculating methods is of regression model calculating method on the basis of the past several data as follows:

$$\theta_L(i) = a0_L \times X_L(i) + a1_L \times X_L(i-1) + a2_L \times X_L(i-2) + g0_L$$

$$\theta_R(i) = a0_R \times X_R(i) + a1_R \times X_R(i-1) + a2_R \times X_R(i-2) + g0_R$$

where $a0_L$, $a1_L$, $a2_L$, $g0_L$, $a0_R$, $a1_R$, $a2_R$, $g0_R$ are a constant, respectively. The above formulae indicate that the leftward steering angle $\theta_L(i)$ at a time point (i) can be obtained on the basis of $X_L(i)$ detected as the leftward white line data at the current time point (i), $X_L(i-1)$ detected at the time point (i−1) one cycle before the current time point (i) and $X_L(i-2)$ detected at the time point (i−2) two cycles before the current time point (i), and similarly the rightward steering angle $\theta_R(i)$ at a time point (i) can be obtained on the basis of $X_R(i)$ detected as the rightward white line data at the current time point (i), $X_R(i-1)$ detected at the time point (i−1) one cycle before the current time point (i) and $X_R(i-2)$ detected at the time point (i−2) two cycles before the current time point (i).

These calculated leftward and rightward steering angles $\theta_L$ and $\theta_R$ are inputted to the steering angle selecting means 3 to which a steering direction switching signal $S_{SW}$ is applied from a travel control unit (not shown) for roughly determining a travel route on the basis of a previously determined travel plan (inputted to the control unit through a keyboard or a mouse), detected current vehicle locations, and map data stored in the control unit. The steering angle selecting means 3 switches the steering direction of the steering angle output $\theta_{out}$ when the leftward steering angle $\theta_L$ becomes roughly equal to the rightward steering angle $\theta_R$ or vice versa after the switching signal $S_{SW}$ has been applied to the selecting means 3.

Further, the switching means 3 cyclically compares these two steering angles $\theta_L$ and $\theta_R$. After the steering direction switching signal $S_{SW}$ has been inputted to the switching means 3, if the two steering angles $\theta_L$ and $\theta_R$ first match each other, the steering angle $\theta_{out}$ is switched from $\theta_L$ to $\theta_R$ or vice versa. Here, the matching of these two steering angles $\theta_L$ and $\theta_R$ is discriminated by checking whether $|\theta_L - \theta_R| < \epsilon$, where $\epsilon$ denotes a predetermined small value. This value $\epsilon$ is determined empirically because a smaller value is preferable to smoothly steer the vehicle but a larger value is preferable to securely turn the vehicle to the left or the right.

Once the steering angle direction has been determined, the steering angle output $\theta_{out}$ is inputted to the steering driver 11 to steer the vehicle 4 in accordance with the switched steering angle output $\theta_{out}$.

Figure 3:
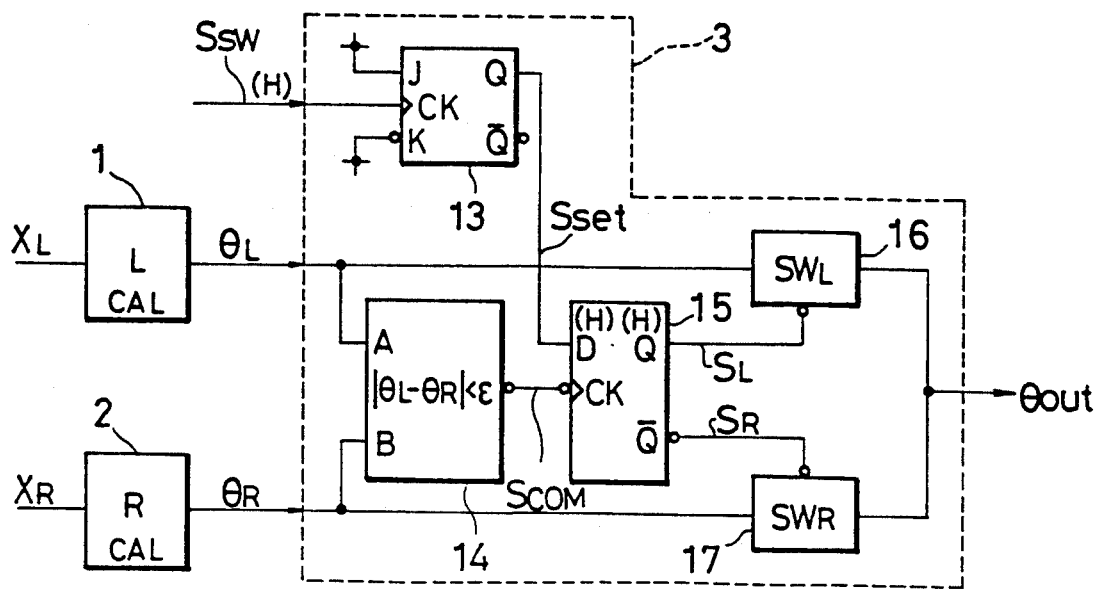
FIG. 3 is a block diagram showing the essential portion of the embodiment shown in FIG. 2.

Here, the switching means 3 will be described in further detail with reference to FIG. 3. The switching means 3 comprises a JK flip-flop (JK-FF) 13, a comparator 14, a D flip-flop (D-FF) 15, a leftward analog switch ($SW_L$) 16 for outputting $\theta_L$, and a rightward analog switch ($SW_R$) 17 for outputting $\theta_R$.

In operation, when a steering direction switching signal $S_{SW}$ is applied to the JK-FF 13, a setting signal $S_{set}$ from the output Q of the JK-FF 13 changes in level from high to low or vice versa. That is, the level of the setting signal $S_{set}$ is switched in response to the switching signal $S_{SW}$. For instance, if $S_{SW}$ is at a high level indicative of a left turn instruction, $S_{set}$ is set to a high level, and if $S_{SW}$ is at a low level indicative of a right turn instruction, $S_{set}$ is set to a low level. On the other hand, the comparator 14 cyclically compares the leftward steering angle $\theta_L$ outputted from the leftward steering angle calculator 1 with the rightward steering angle $\theta_R$ outputted from the rightward steering angle calculator 2 and outputs a compare signal $S_{com}$ to the D-FF 15 when the difference in absolute between the two $|\theta_L - \theta_R|$ becomes smaller that a predetermined small value $\epsilon$. In synchronism with this pulse signal $S_{com}$, the D-FF 15 determines whether the analog switch 16 or 17 is turned on in accordance with the level of the setting signal 18. In more detail, if the setting signal $S_{set}$ is at a high level, the output Q of the D-FF 15 is set to a high level in response to the compare signal $S_{com}$, so that the analog switch 16 is turned on to output the leftward steering angle $\theta_L$. In contrast, if the setting $S_{set}$ is at a low level, the output $\overline{Q}$ of the D-FF 15 is set to a high level in response to the compare signal $S_{com}$, so that the analog switch 17 is turned on to output the rightward steering angle $\theta_R$.

Figure 4:
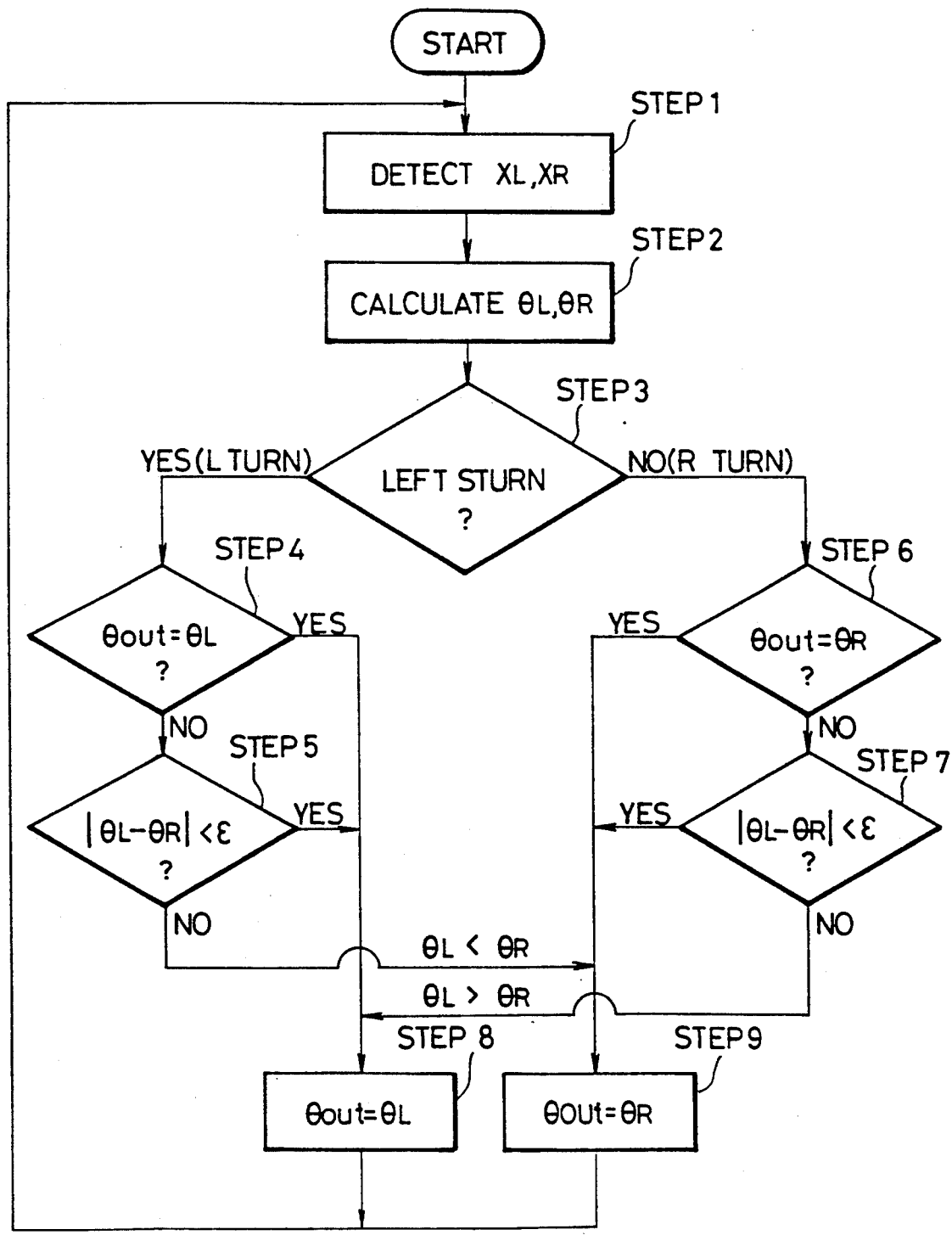
FIG. 4 is a flowchart for assistance in explaining the operation of the embodiment shown in FIGS. 2 and 3.

With reference to the flowchart shown in FIG. 4, the operation of the control apparatus will be explained in further detail. When the vehicle 4 is running under self-controlled conditions, the leftward camera 7 and the leftward image processor 9 detect the leftward white line distance data $X_L$ and the rightward camera 8 and the rightward image processor 10 detect the rightward white line distance date $X_R$ (in step 1). The leftward steering angle calculator 1 calculates a leftward steering angle $\theta_L$ on the basis of the detected distance $X_L$ and the rightward steering angle calculated 2 calculates a rightward steering angle $\theta_R$ on the basis of the detected distance $X_R$ (in step 2). Control checks whether the steering direction switching signal $S_{SW}$ or the setting signal $S_{set}$ is at a high level indicative of the left turn or a low level indicative of the right turn (in step 3). If YES (left turn), control further checks whether the steering angle output $\theta_{out}$ is the leftward steering angle $\theta_L$ (in step 4). If $\theta_{out}$ has already been set to $\theta_L$, $\theta_{out}$ is kept set to $\theta_L$ (in step 8). If $\theta_{out}$ is not yet $\theta_L$ (in step 4), control compares $\theta_L$ with $\theta_R$ (in step 5). If $\theta_L$ is roughly equal to $\theta_R$, $\theta_{out}$ is set to $\theta_L$ in accordance with the left turn instruction (in step 8). If $Q_L$ is not roughly equal to $\theta_R$ (in step 5), $\theta_{out}$ is set to $\theta_R$ in spite of the left turn instruction (in step 9). In contrast, if NO (right turn) (in step 3), control further checks whether the steering angle output $\theta_{out}$ is the rightward steering angle $\theta_R$ (in step 6). If $\theta_{out}$ has already been set to $\theta_R$, $\theta_{out}$ is kept set to $\theta_R$ (in step 9). If $\theta_{out}$ is not yet $\theta_R$ (in step 6), control compares $\theta_L$ with $\theta_R$ (in step 7). If $\theta_L$ is roughly equal to $\theta_R$, $\theta_{out}$ is set to $\theta_R$ in accordance with the right turn instruction (in step 9). If $\theta_R$ is not roughly equal to $\theta_R$ (in step 7), $\theta_{out}$ is set to $\theta_L$ in spite of the right turn instruction (in step 8).

Therefore, in step 8, $\theta_{out}$ is set to $\theta_L$ under the conditions that the switching instruction is the left turn (in step 3) and $\theta_{out}$ has already been set to $\theta_L$ (in step 4); the switching instruction is the left turn (in step 3), $\theta_{out}$ is not yet set to $\theta_L$ (in step 4), and $\theta_L$ is roughly equal to $\theta_R$ (in step 5); and further the switching instruction is the right turn (in step 3), $\theta_{out}$ is not yet set to $\theta_R$ (in step 6), and $\theta_R$ is not yet equal to $\theta_L$ (in step 7).

Similarly, in step 9 $\theta_{out}$ is set to $\theta_R$ under the conditions that the switching instruction is the right turn (in step 3) and $\theta_{out}$ has already been set to $\theta_R$ (in step 6); the switching instruction is the right turn (in step 3), $\theta_{out}$ is not yet set to $\theta_R$ (in step 6), and $\theta_R$ is roughly equal to $\theta_L$ (in step 7); and further the switching instruction is the left turn (in step 3), $\theta_{out}$ is not yet set to $\theta_L$ (in step 4), and $\theta_L$ is not yet equal to $\theta_R$ (in step 5).

In summary, when the steering direction switching signal $S_{SW}$ is the left turn (in step 3), if the steering angle $\theta_{out}$ has already been switched to the leftward steering angle $\theta_L$ (in step 4), $\theta_{out}$ is of course kept at $\theta_L$ (in step 8). However, if $\theta_{out}$ is not yet switched to $\theta_L$ (in step 4), only when $\theta_L$ increases and therefore becomes roughly equal to the preceding $\theta_R$ (in step 5), $\theta_{out}$ is switched to $\theta_L$ in accordance with the left turn instruction (in step 8). Once switched to $\theta_L$ (in step 8), $\theta_{out}$ is kept at $\theta_L$ after $\theta_L$ has been more increased (in step 4). On the other hand, however, if $\theta_R$ is larger than $\theta_L$ (in step 5), $\theta_{out}$ is kept at $\theta_R$ (in step 9) even after the left turn has been instructed (in step 3).

Similarly, when the steering direction switching signal $S_{SW}$ is the right turn (in step 3), if the steering angle $\theta_{out}$ has already been switched to the rightward steering angle $\theta_R$ (in step 6), $\theta_{out}$ is of course kept at $\theta_R$ (in step 9). However, if $\theta_{out}$ is not yet switched to $\theta_R$ (in step 6), only when $\theta_R$ increases and therefore becomes equal to $\theta_L$ (in step 7), $\theta_{out}$ is switched to $\theta_R$ in accordance with the right turn instruction (in step 9). Once switched to $\theta_R$ (in step 9), $\theta_{out}$ is kept at $\theta_R$ after $\theta_R$ has been more increased (in step 6). On the other hand, however, if $\theta_L$ is larger than $\theta_R$ (in step 7), $\theta_{out}$ is kept at $\theta_L$ (in step 8) even after the right turn has been instructed (in step 3).

The assumption is made that the vehicle 4 is now being turning to the left (L) and then will turn to the right (R). Under the left turn condition, the steering angle output $\theta_{out}$ is $\theta_L$ so that the setting signal $S_{set}$ is at a high level and therefore the SW$_L$ 16 is kept on and the SW$_R$ 17 is kept turned off. When a switching signal $S_{SW}$ for switching the left turn to the right turn is applied from the travel control unit (not shown) to the JK-FF 13, the setting signal $S_{set}$ is set to a low level. After the setting signal $S_{set}$ has been set to a low level, when the difference $|\theta_L - \theta_R|$ becomes less than a predetermined value $\epsilon$ (i.e. $\theta_R$ becomes roughly equal to $\theta_L$), a compare signal $S_{com}$ is applied from the comparator 14 to the D-FF 15, so that the analog switch 16 is turned off and the analog switch 17 is turned on in order to switch the steering angle output $\theta_{out}$ from $\theta_L$ to $\theta_R$.

In the above-mentioned operation, when the vehicle is running along a straight line, there exists a certain steering angle vibration within a range of $|\theta_R - \theta_L| < \epsilon$. Therefore, when the steering angle vibration lies within this range, the steering angle will not be changed. However, when the steering angle exceeds this vibration range, the steering angle is switched only when $\theta_R$ and $\theta_L$ roughly match each other and after the steering direction switching signal $S_{sw}$ has been applied from the travel control unit to the control apparatus. Once having been switched, the steering angle is kept at the switched direction until being switched again in accordance with the steering direction switching signal.

Further, since the steering direction is switched when the leftward steering angle, for instance matches the preceding (finally detected) rightward steering angle, before the steering angle is reduced down to zero (in parallel to the white line) which is different from the prior-art apparatus, it is possible to more quickly switch the steering angle, after the steering direction switching instruction has been received by the control apparatus.

In other words, the steering angle output $\theta_{out}$ is not switched on the basis of only the switching signal $S_{sw}$, but switched when $\theta_L$ becomes roughly equal to $\theta_R$ or vice versa. Therefore it is possible to smoothly switch the steering direction at optimum timings, thus enabling the vehicle to be self-controlled stably.

What is claimed is:

1. A vehicle steering control apparatus for automatically driving a vehicle along a road on the basis of both road end position information and in response to a steering direction switching signal, comprising:
    (a) leftward detecting means for cyclically detecting a leftward road end position data;
    (b) leftward steering angle calculating means for calculating a leftward steering angle on the basis of the detected leftward road end position data;
    (c) rightward detecting means for cyclically detecting a rightward road end position data;
    (d) rightward steering angle calculating means for calculating a rightward steering angle on the basis of the detected rightward road end position data;
    (e) switching means for switching a vehicle steering angle output from the calculated leftward steering angle to the calculated rightward steering angle or vice versa in accordance with the steering direction switching signal at a timing when the calculated leftward and rightward angles match each other; and
    (f) steering driving means for driving vehicle steering in accordance with the switched steering angle output.

2. The vehicle steering control apparatus of claim 1, wherein said leftward detecting means comprises:
    (a) a leftward camera mounted on a front portion of the vehicle, for cyclically taking an image of the leftward road end position information;
    (b) a leftward image processor for detecting a leftward distance between the leftward road end position information and a vehicle longitudinal axis at a frontward observation point, and wherein said rightward detecting means comprises:
    (c) a rightward camera mounted on a front portion of the vehicle, for cyclically taking an image of the rightward road end position information; and
    (d) a rightward image processor for detecting a rightward distance between the rightward road end position information and the vehicle longitudinal axis at the frontward observation point.

3. The vehicle steering control apparatus of claim 1, wherein said switching means comprises:
    (a) a JK flip-flop for outputting a first level setting signal in response to a leftward steering direction switching signal and a second level setting signal in response to a rightward steering direction switching signal;
    (b) a comparator for comparing the leftward steering angle and the rightward steering angle and outputting a compare signal when differences between the two steering angles becomes less than a predetermined small value;
    (c) a D flip-flop for outputting a leftward steering signal in accordance with the first level setting signal and in synchronism with the compare signal and a rightward steering signal in accordance with the second level setting signal and in synchronism with the compare signal;
    (d) a leftward switch for outputting the leftward steering angle as a steering angle output in response to the leftward steering signal; and
    (e) a rightward switch for outputting the rightward steering angle as a steering angle output in response to the rightward steering signal.

4. The vehicle steering control apparatus of claim 1, both road end position information can be obtained on the basis of leftward and rightward white lines painted on both side ends of a road, respectively.

5. The vehicle steering control apparatus of claim 1, wherein both road end position information can be obtained on the basis of leftward and rightward conical rubbers arranged along both side ends of a road, respectively.

6. A method of automatically driving a vehicle along a road on the basis of both road end position information and in response to a steering direction switching signal, comprising the steps of:
   (a) cyclically detecting a leftward distance between the leftward road end position information and a vehicle longitudinal axis at a frontward observation point and a rightward distance between the rightward road end position information and the vehicle longitudinal axis at the frontward observation point;
   (b) calculating a leftward steering angle on the basis of the detected leftward distance and a rightward steering angle on the basis of the detected rightward distance;
   (c) checking whether the steering direction switching signal is a leftward steering switching signal or a rightward steering switching signal;
   (d) if the leftward steering switching signal is checked, checking whether the leftward steering angle is approximately equal to the rightward steering angle;
   (e) if approximately equal thereto, switching the steering angle output to the leftward steering angle in accordance with the checked leftward steering switching signal;
   (f) if the rightward steering switching signal is checked, checking whether the rightward steering angle is approximately equal to the leftward steering angle; and
   (g) if approximately equal thereto, switching the steering angle output to the rightward steering angle in accordance with the checked rightward steering switching signal.

7. The method of claim 6, wherein even if the leftward steering switching signal is checked in step (c) of claim 6, the rightward steering angle is kept outputted as the steering angle output when the rightward steering angle is more than the leftward steering angle; and even if the rightward steering switching signal is checked in step (c) of claim 6, the leftward steering angle is kept outputted as the steering angle output when the leftward steering angle is more than the rightward steering angle.

8. The method of claim 6, wherein when the leftward steering switching signal is checked in step (c) of claim 6 and further the steering angle output has already been switched to the leftward steering angle, the leftward steering angle is kept outputted as the steering angle output; and when the rightward steering switching signal is checked in step (c) of claim 6 and further the steering angle output has already been switched to the rightward steering angle, the rightward steering angle is kept outputted as the steering angle output.

* * * * *